United States Patent
Backhaus et al.

(10) Patent No.: US 9,862,547 B2
(45) Date of Patent: Jan. 9, 2018

(54) CONVEYOR FOR CONTAINERS

(71) Applicant: KHS GmbH, Dortmund (DE)

(72) Inventors: Martin Backhaus, Unna (DE); Berthold Paroth, Dortmund (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/038,178

(22) PCT Filed: Oct. 31, 2014

(86) PCT No.: PCT/EP2014/073430
§ 371 (c)(1),
(2) Date: May 20, 2016

(87) PCT Pub. No.: WO2015/074850
PCT Pub. Date: May 28, 2015

(65) Prior Publication Data
US 2016/0280465 A1    Sep. 29, 2016

(30) Foreign Application Priority Data
Nov. 20, 2013   (DE) .................. 10 2013 112 833

(51) Int. Cl.
| | |
|---|---|
| *B65G 23/04* | (2006.01) |
| *B65G 23/22* | (2006.01) |
| *B65G 15/50* | (2006.01) |
| *B65G 23/00* | (2006.01) |
| *B65G 43/00* | (2006.01) |

(52) U.S. Cl.
CPC ............. *B65G 23/22* (2013.01); *B65G 15/50* (2013.01); *B65G 23/00* (2013.01); *B65G 43/00* (2013.01)

(58) Field of Classification Search
CPC ..................................................... B65G 23/04
USPC .......... 198/832, 835, 575, 577, 459.8, 460.3
See application file for complete search history.

(56) References Cited

U.S. PATENT DOCUMENTS

| | | | |
|---|---|---|---|
| 4,285,282 A | * | 8/1981 | Good ........................ F23G 5/16 110/216 |
| 4,724,036 A | * | 2/1988 | Hill ............................ B65C 3/16 156/497 |
| 6,032,788 A | | 3/2000 | Smithers et al. |

(Continued)

FOREIGN PATENT DOCUMENTS

| | | |
|---|---|---|
| CN | 1938206 | 3/2007 |
| DE | 4009517 | 9/1991 |

(Continued)

*Primary Examiner* — Leslie A Nicholson, III
*Assistant Examiner* — Lester Rushin
(74) *Attorney, Agent, or Firm* — Occhiuti & Rohlicek LLP

(57) ABSTRACT

A multi-track conveyor for transporting containers includes two transport elements adjacent to one another to form a common transport surface on which the containers stand upright on their container bases. Each transport element has a dedicated electric drive motor. The drive motors are external-rotor motors with an internal stator connected in a torsion-resistant manner to a machine frame and with an external rotor, which forms an offset drive driving the respective transport element. The drive motors of at least two transport elements are coaxial with their motor axles oriented perpendicular to the transport direction. The stators of which are connected via a common support in a rotation-resistant manner to the machine frame.

20 Claims, 7 Drawing Sheets

(56) References Cited

U.S. PATENT DOCUMENTS

| | | | | |
|---|---|---|---|---|
| 6,378,865 | B1* | 4/2002 | Brotherston | B65H 5/023 198/575 |
| 7,287,640 | B1 | 10/2007 | Schmutzler | |
| 2008/0116041 | A1* | 5/2008 | Hall | B65G 13/07 198/790 |

FOREIGN PATENT DOCUMENTS

| | | |
|---|---|---|
| DE | 10145542 | 4/2003 |
| DE | 202005013125 | 11/2005 |
| DE | 10 2006 004 421 | 8/2006 |
| DE | 10 2006 039086 | 2/2008 |
| DE | 20 2012 005 380 | 9/2013 |
| EP | 2 272 320 | 1/2011 |
| SU | 1687686 A1 * | 10/1991 |
| WO | WO 2004/039706 | 5/2004 |
| WO | WO2007/006324 | 1/2007 |

* cited by examiner

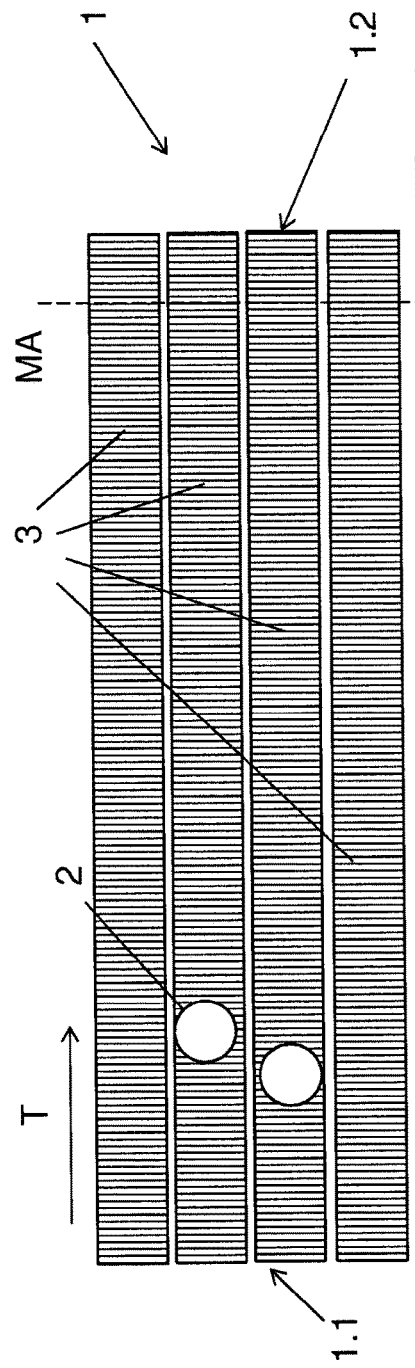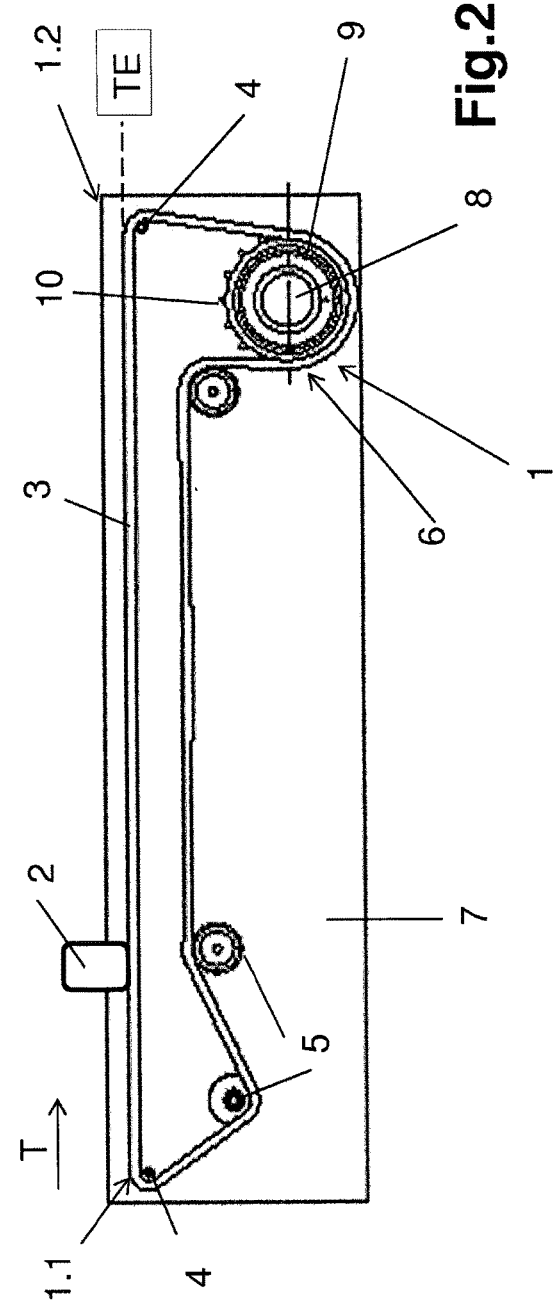

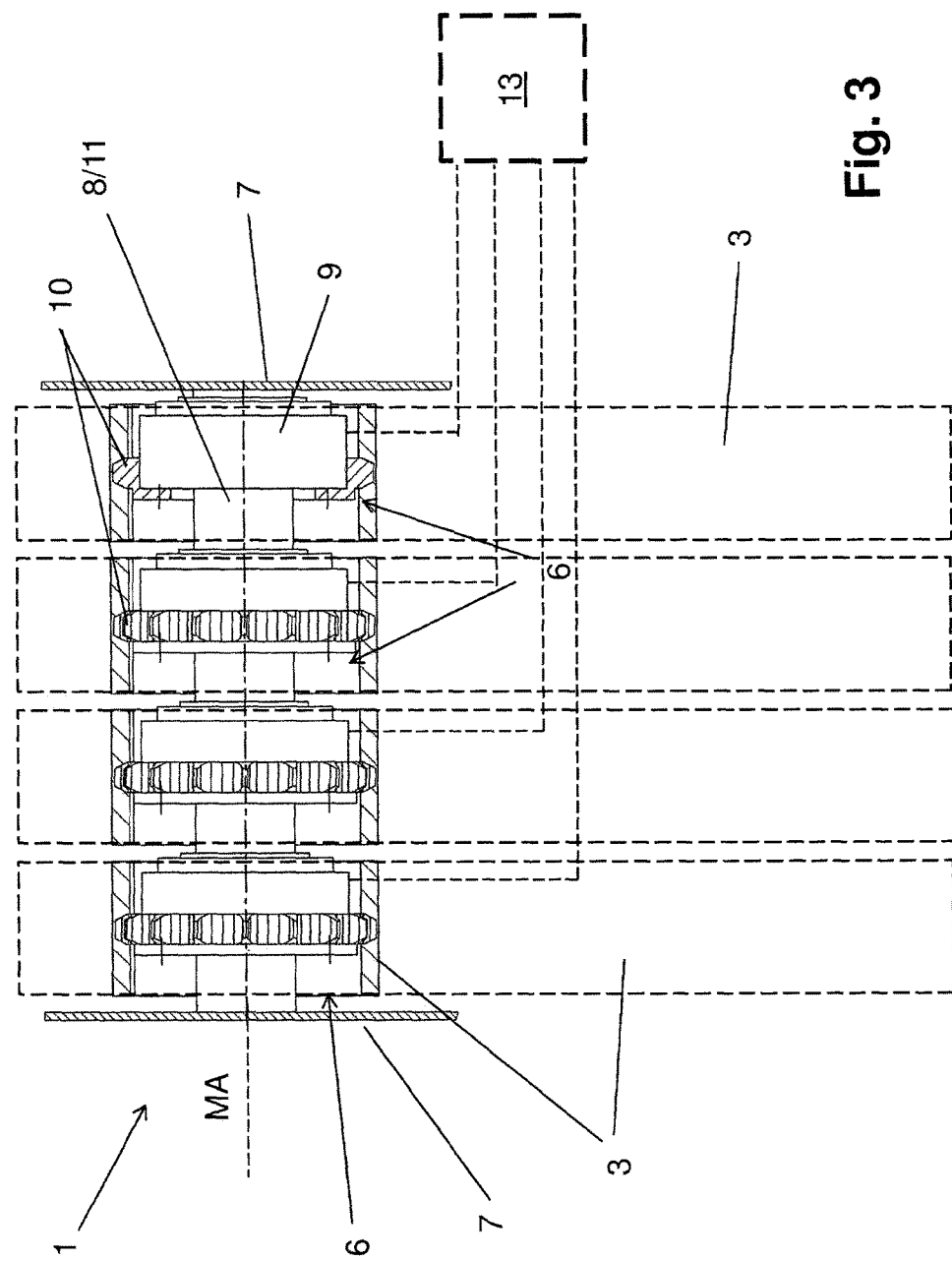

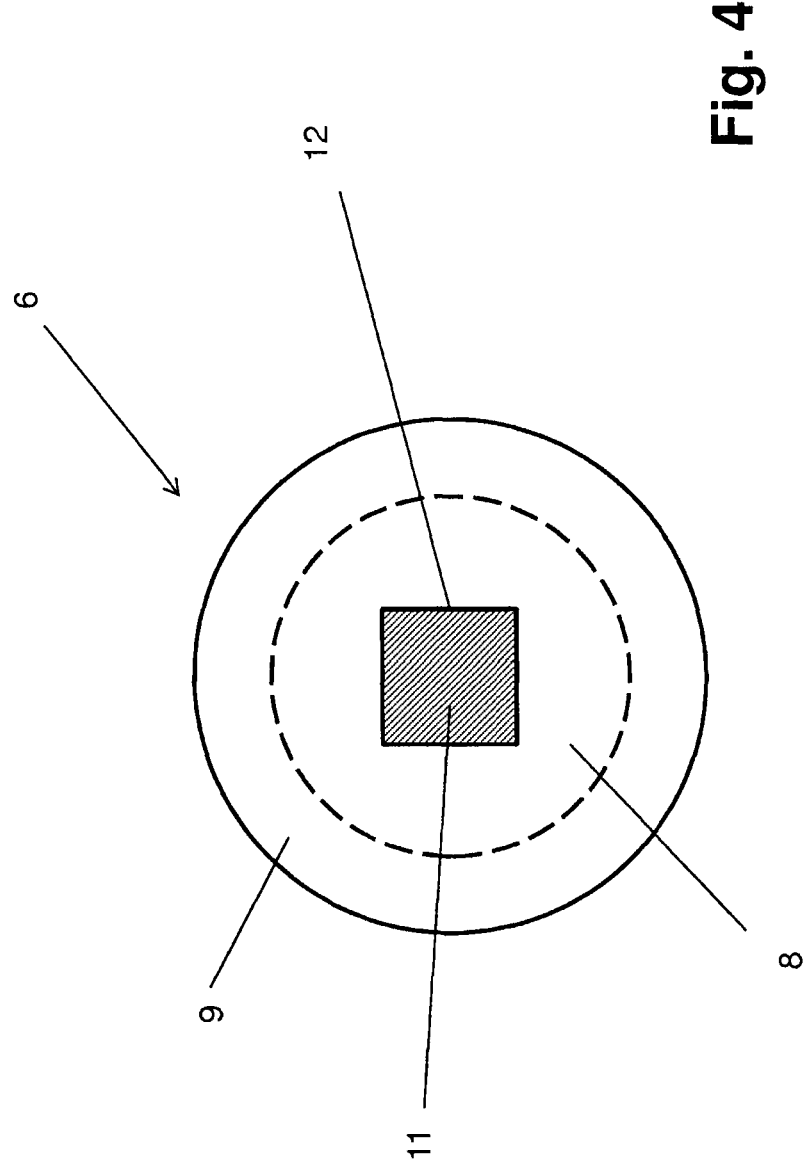

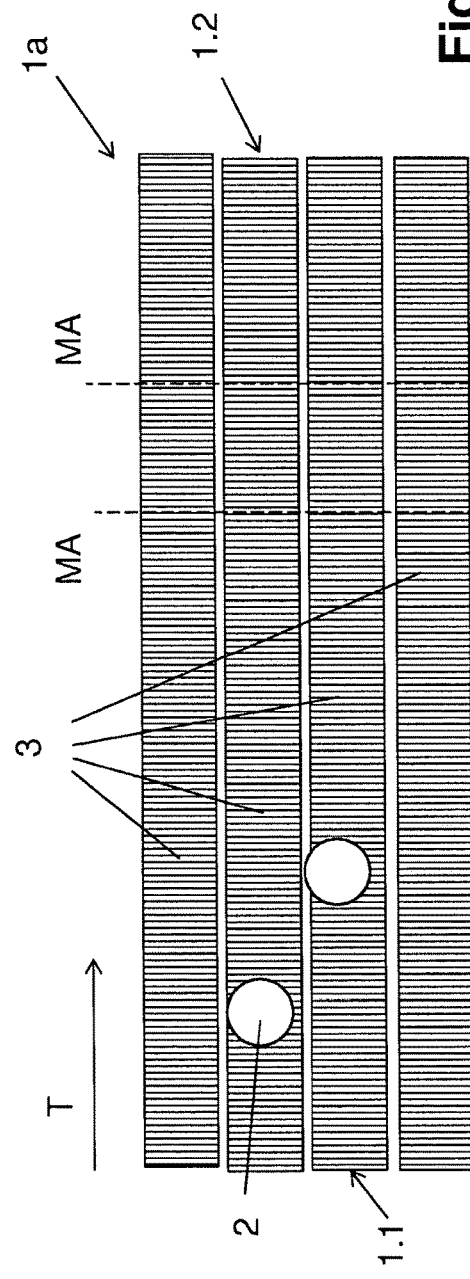
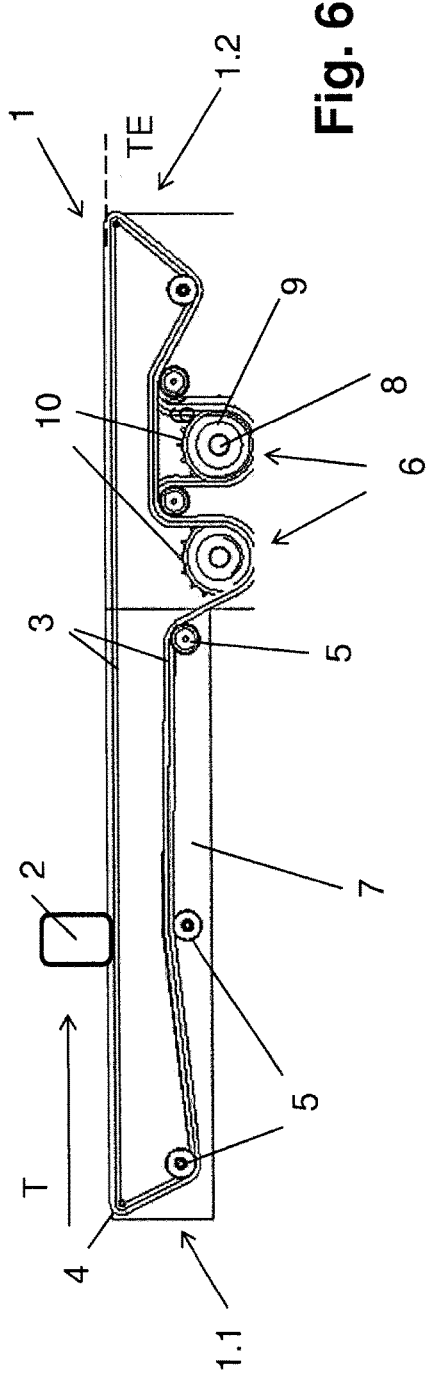

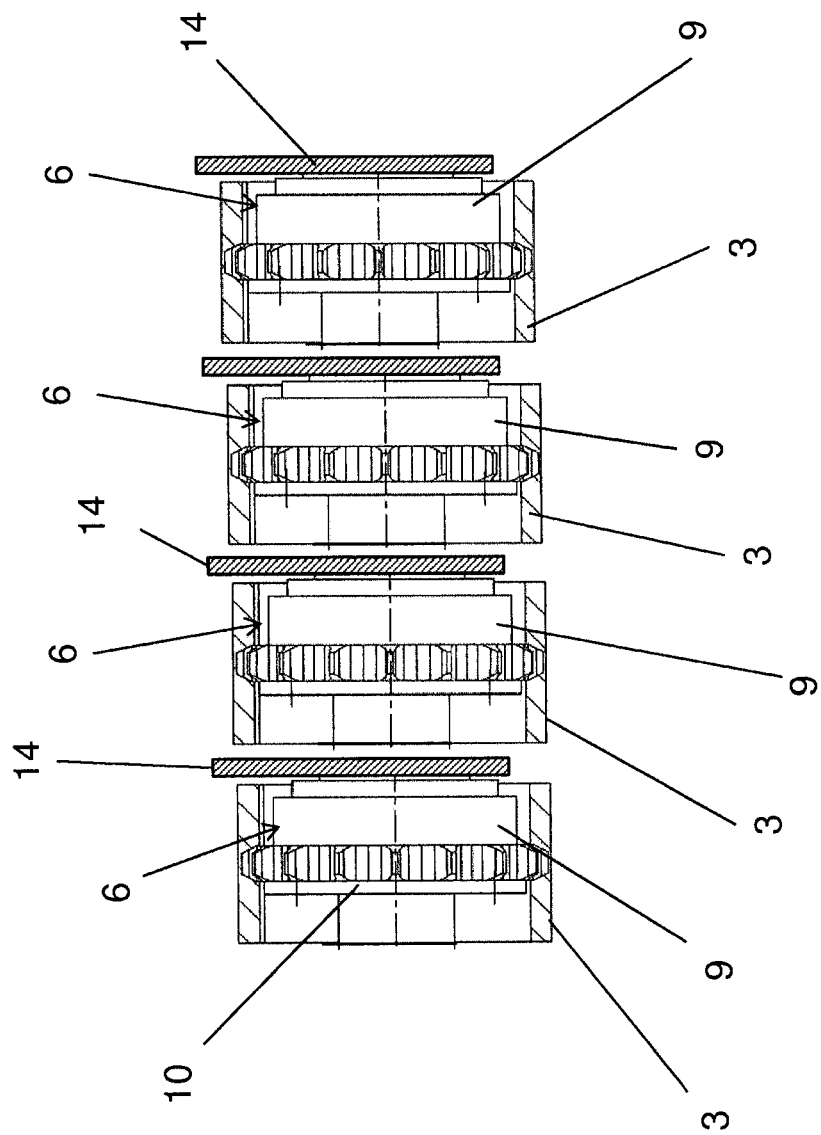

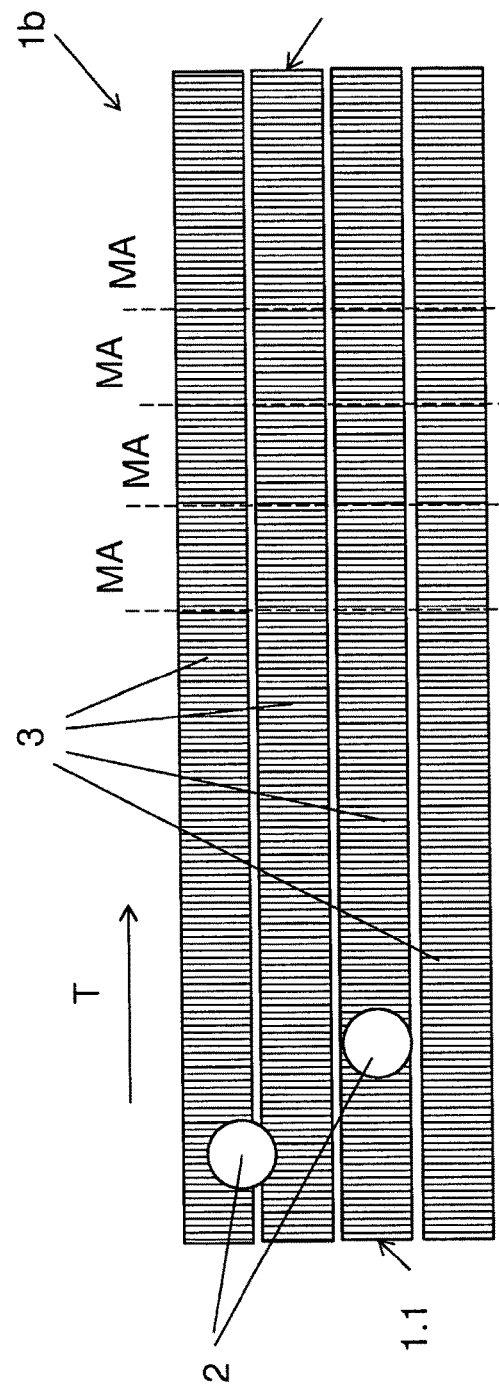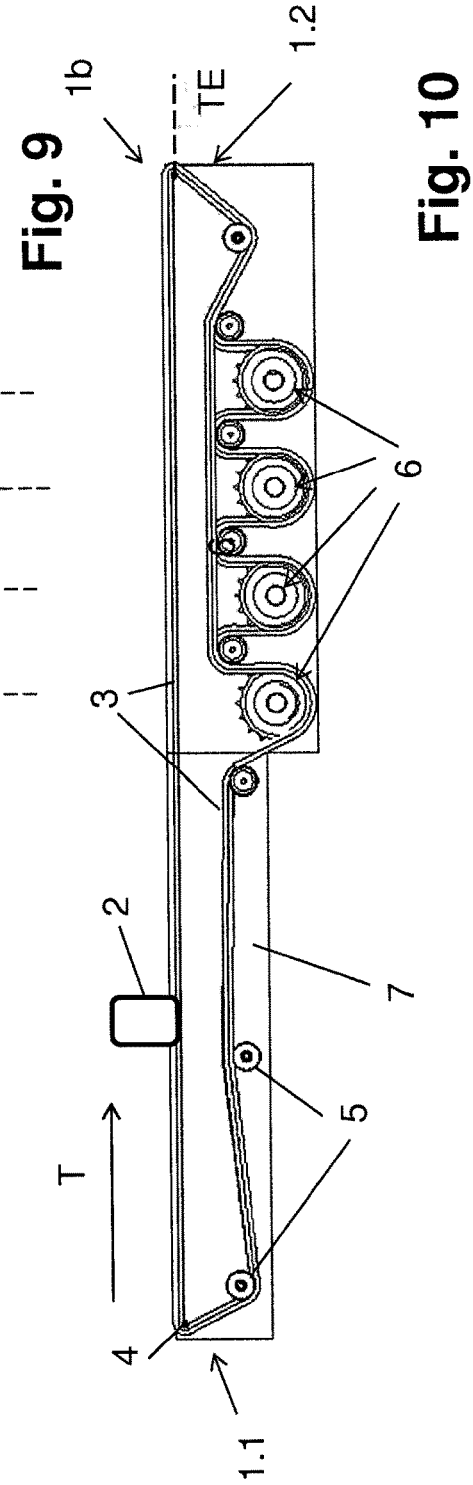

CONVEYOR FOR CONTAINERS

RELATED APPLICATIONS

This application is the national stage, under 35 USC 371, of PCT application PCT/EP2014/073430, filed on Oct. 31, 2014, which claims the benefit of the Nov. 20, 2013 priority date of German application DE 102013112833.5, the content of which is herein incorporated by reference.

FIELD OF INVENTION

The invention relates to container packaging, and in particular, to conveyors for transporting containers.

BACKGROUND

Devices or conveyors for the transporting of transported products in the form of packing units, containers, and/or packages are known in the beverage industry to transport containers from one treatment station to a treatment station downstream in the transport direction of the containers.

Also known are conveyors with multiple conveyor or transport elements or belts, i.e. transport elements connected to one another perpendicular to a transport direction and forming a common transport surface, wherein these transporters have different functions, for example, for turning a single-track container stream into a multi-track container stream or to render a container stream more compact or to thin it out.

Also known is for such transporters with multiple conveyor or transport elements to be used for the rotating of containers, packing units, or packages, such as cartons.

With known conveyors, with which the transport elements or transport bands are arranged adjacent to one another perpendicular to a transport direction, form a common, for example, horizontal, transport surface and are therefore suitable for the transporting of containers, it is usual for a plurality of transport elements to be driven by a common drive unit with a single drive motor about a common shaft such that the same transport speed is attained for these transport elements. If several different transport speeds are required for transport elements connecting to one another in the transport direction, it is necessary for a plurality of drive units to be provided for, wherein each drive unit in turn comprises a single drive motor, which drives a plurality of transport elements by way of at least one drive shaft. Due to the drive shafts and their mountings, known transporters are elaborate and expensive and require increased maintenance effort, for example for the lubrication of the bearings for the drive shafts, etc.

SUMMARY

An object of the invention is to provide a conveyor that avoids the advantages referred to, and with high operational reliability allows for a substantial reduction of effort and expenditure in respect of structural design.

By way of the invention, the complexity and design effort and expenditure of a conveyor are substantially reduced. In particular, there is no need for drive shafts and their bearings, or, with the configuration of the electric drives as external-rotor motors, also for separate deflection drives for driving the transport elements A particular feature of the invention is that a dedicated drive motor is provided for each transport element. This motor is an external-rotor motor, i.e. a motor with an external rotor, which preferably is formed from the outer motor housing. The drive motor then advantageously forms the offset drive for the transport element, i.e. the offset drive driving the transport element, and the bearings of the motor are simultaneously the bearings of this offset drive.

The conveyor or transport elements are, for example, the conveyor or transport belts, bands, or chains conventional for transporters, such as hinge band chains.

"Containers" in the meaning of the invention are, in particular, cans, bottles, tubes, pouches, in each case made of metal, glass, and/or plastic, but also other packing means, in particular also such as are suitable for the filling of powder-form, granulate, fluid, or viscous products.

"Packing units" in the meaning of the invention are in particular such containers filled with a product.

"Multi-track transport bands arranged transverse to the transport direction" or "multi-track transport elements arranged transverse to the transport direction" signify in the meaning of the invention an arrangement of the transport bands or transport elements in such a way that, adjacent to one another transverse or perpendicular to a transport direction, they form, with at least a part of their upper loop length in each case, a common transport surface, for example horizontal, for the transport product.

The expression "essentially" or "approximately" or "approx." signifies in the meaning of the invention deviations from the exact value in each case by +/−10%, preferably by +/−5%, and/or deviations in the form of changes which are not of significance for the function.

Further embodiments, advantages, and possible applications of the invention are also derived from the following description of exemplary embodiments and from the figures. In this situation, all the features described and/or figuratively represented are, individually or in any desired combination, in principle the object of the invention, regardless of their relationship in the claims or references to them. The content of the claims is also made a constituent part of the description.

BRIEF DESCRIPTION OF THE FIGURES

The invention is described hereinafter on the basis of the figures relating to exemplary embodiments. The figures show:

FIGS. 1 and 2, in a schematic representation, a conveyor in a view from above and in a side view;

FIG. 3, in a part representation, a view from below of the conveyor from FIGS. 1 and 2 in the region of the drive unit for the transport elements;

FIG. 4, in a schematic representation, a drive motor of the drive unit of the conveyor from FIGS. 1 and 2, with its stator arranged in a torsion-resistant manner on an axis;

FIGS. 5 and 6, in representations similar to FIGS. 1 and 2, a further embodiment of the conveyor;

FIG. 8, a representation similar to FIG. 3 with a further embodiment;

FIGS. 9 and 10, in schematic representation, in a view from above and in a side view, a further embodiment of the conveyor.

DETAILED DESCRIPTION

Figure 7:
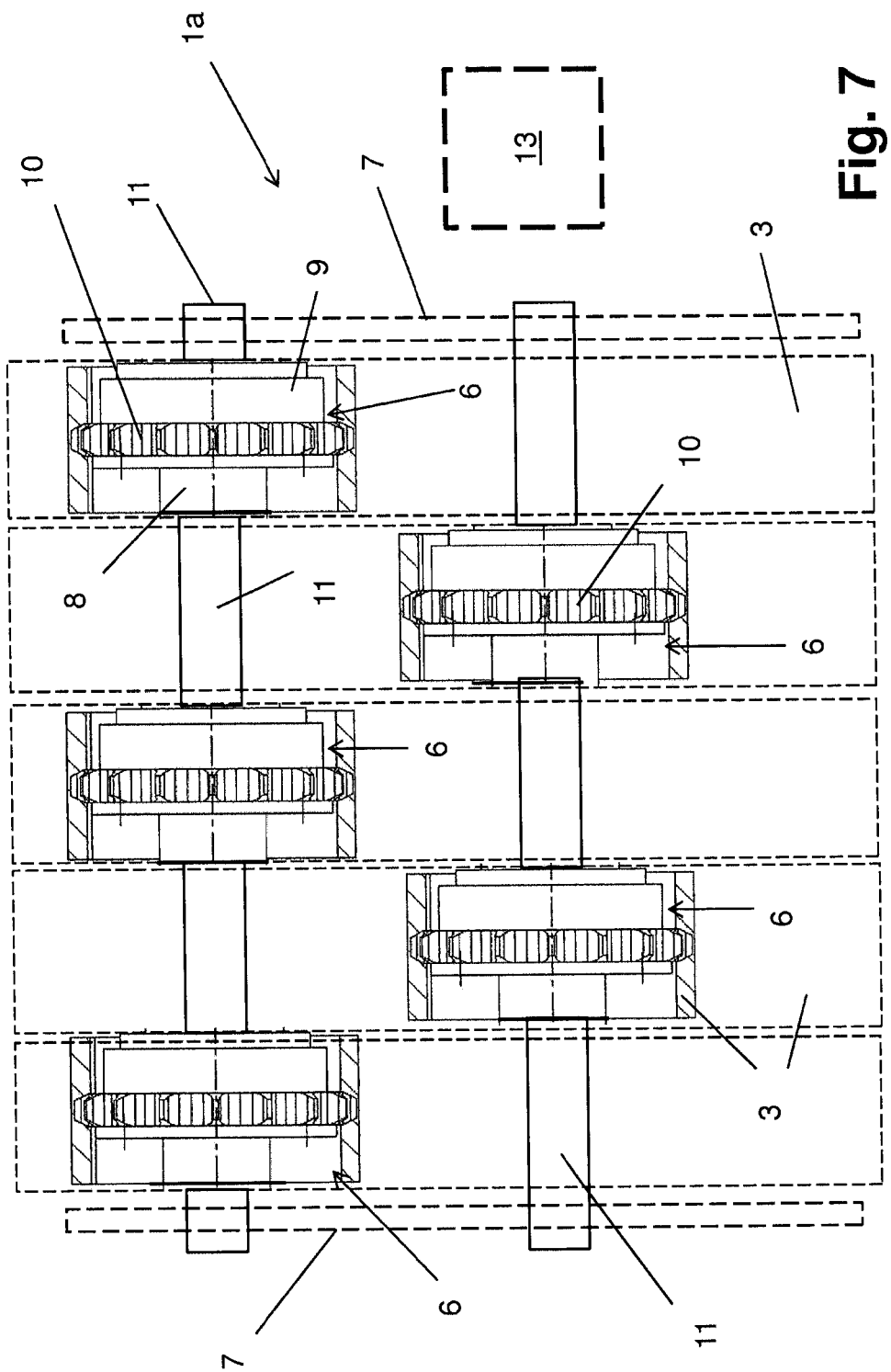
FIG. 7, a view from below of the conveyor from FIGS. 5 and 6 in the region of the drive unit for the transport elements.

FIGS. 1-3 show a first conveyor 1 having three transport elements 3 for transporting containers 2 in a transport direction T. Each transport element 3 forms a closed loop that is driven in an endlessly circulating manner. Examples of suitable transport elements 3 include transport belts, hinged band chains, or other transport bands suitable for the transport of containers 2.

The first conveyor 1 is a multi-track conveyor with each transport element 3 defining a track. The transport elements 3 are thus spaced apart and adjacent to one another so that as one proceeds in a direction transverse or perpendicular to the transport direction T one crosses over each transport element 3. At least a part of the upper lengths of the transport elements 3 define a common horizontal transport surface, or transport plane TE, on which the containers 2 stand on their container bases.

For each transport element 3, the transport direction T defines a front end 1.1 and a back end 1.2. First and second offset drives 4 at the front and back ends 1.1, 1.2 guide the transport element 3. Other offset drives 5 for the transport elements are located beneath the transport plane TE, as shown in FIG. 2.

Also below the transport plane TE are drive motors 6, each of which is dedicated to one of the transport elements 3. Since the embodiment shown in FIG. 1 has a total of four transport elements 3, there are accordingly four drive motors.

Each dedicated drive motor 6 is an electric motor. Preferably, the motor is a gearless motor. Examples include direct-drive electric motors and torque motors.

Each electric motor has an internal stator 8 and an external rotor 9. The internal stator 8 connected to a machine frame 7 of the conveyor 1 in a torsion-resistant manner. In those cases where the transport elements 3 are chains, the rotor 9 has a chain tooth arrangement 10 at its circumferential surface, which concentrically surrounds a motor axle MA that is oriented perpendicular to the transport direction T. The drive motors 6 collectively form the conveyor's drive unit. Each rotor 9 forms an offset drive that drives its corresponding transport element 3.

Referring to FIGS. 3 and 4, the stators 8 of all the drive motors 6 are arranged on a common support axle 11, which is held in a torsion-resistant manner at both ends by the machine frame 7. The stator 8 of each drive motor 6 has a non-circular opening or passage aperture 12. In the illustrated embodiment, the aperture 12 has a square cross-section. The shape of the aperture 12 matches that of the support axle 11. As a result, the support axle 11 holds the stators 8 of all the drive motors 6 in a torsion-resistant manner relative to the machine frame 7.

A common control device 13 actuates the drive motors 6. In some embodiments, the common control device 13 is the conveyor's machine controller or a part of the conveyor's machine controller. Alternatively, the common control device 13 can be part of a control system for a system that comprises the conveyor 1.

The control device 13 actuates the drive motors 6 in such a way that the transport elements 3 move in the transport direction T in synchrony with one another at the same transport speed. Where necessary, the controller 13 can also cause the transport elements 3 to move at different transport speeds. This technique is useful for transforming a wide container stream into a narrow container stream or vice versa.

In other embodiments, each drive motor 6 has its own dedicated control device for controlling it. These can be in the form of an arrangement of driver-stages, with the stages being controlled by a central control unit. In this case, a central control unit is a system controller or a part of the system controller. Alternatively, one of the control devices allocated to the drive motors 6 is designated as the master. In this embodiment, the designated master actuates and/or monitors the control devices of the other drive motors 6.

As shown in FIG. 2, the offset drives 5 and the respective drive motor 6 are arranged in such a way that each transport element 3 surrounds the outer rotor 9 of its drive motor 6 at an angle that which is sufficiently large for the drive, i.e. for example at an angle range of 180° or approximately 180°.

FIGS. 5-7 show a second conveyor 1a that comprises five transport elements 3 arranged next to one another transverse to the transport direction T, each of which is driven to circulate by a dedicated drive motor 6, with the drive motors 6 forming a drive unit. Unlike the first embodiment, the drive motors 6 of the conveyor 1a are not all coaxial with their motor axles MA. Instead the drive motors 6 form a plurality of groups.

In particular, in the second conveyor 1a of FIG. 7, the drive motors 6 form first and second groups. The first group has three drive motors 6; the second group has two drive motors 6. The drive motors 6 of each group are arranged coaxially with their motor axles MA, and specifically on a support axle 11. The support axle 11 has a non-circular cross-section that is keyed to conform to corresponding passage apertures 12 of the stators 8 through which it passes. The two groups of drive motors 6, and therefore their two support axles 11, are offset against one another in the transport direction T.

It has been assumed that the stators 8 of the drive motors 6 each have a passage aperture 12 such that a reliably torsion-resistant arrangement of the stators 8 in a simple manner is possible on the support axle 12.

A passage aperture 12 is not, however, necessary. For example, FIG. 8 shows an embodiment in which the stators 8 of the drive motors 6 do not have a passage aperture 12. Each stator 8 is therefore secured laterally in a torsion-resistant manner to a retaining structure 14 of the machine frame 7.

The use of drive motors 6 in which the stators 8 lack the passage aperture 12 offers some advantages. For example, in such cases, the motor can achieve a higher torque value than a similarly sized drive motor 6 having a passage aperture 12 in the stator 8.

In a third conveyor 1b, shown in FIGS. 9 and 10, has four transport elements 3 are arranged adjacent to each other in a direction perpendicular to the transport direction T. Each transport element has a dedicated drive motor 6. The drive motors 6 and their motor axles MA, which are oriented perpendicular to the transport direction T, are offset against one another in relation to the transport direction T. Each stator 8 has a passage aperture 12. The passage aperture 12 holds the drive motor 6 to the support axle 11 in a torsion-resistant manner. Alternatively, the passage aperture 12 holds the drive motor 6 to the retaining structure 14 in a torsion-resistant manner.

In principle, the third conveyor 1b offers the possibility for at least some of the drive motors 6 to be have a motor axle MA that is coaxial to at least one further drive motor 6. The result is that the third conveyor 1b in fact comprises, connecting to one another perpendicular to the transport direction T, more than four transport elements 3, or, respectively, the transport elements represented in FIG. 9 are provided, at least in part, at least as twofold.

The number of transport elements 3 can also differ from the embodiments described. In the embodiments illustrated this far, the rotors 9 of the drive motors 6 are located outside. It is also possible to make use for the drive of the transport elements 3 of electric motors, and in this situation, in turn, preferably gearless electric motors, i.e. directly driven electric motors, preferably in the form of torque motors, which comprise an interior rotor, and then, on this or on its rotor shaft, a wheel is provided which drives the respective transport element 3 and is provided, for example, with a tooth arrangement 10. In order in this situation to achieve the required close connection of the transport elements 3 in the axial direction perpendicular to the transport direction T, the drive motors and, respectively, their motor axles oriented perpendicular to the transport direction T, are offset to one another radially to these axles, for example in the manner represented in FIG. 10.

Having described the invention, and a preferred embodiment thereof, what is claimed as new, and secured by Letters Patent is:

1. An apparatus comprising a conveyor for transporting containers in a transport direction with at least two transport elements forming a closed loop and capable of being driven in an endless circulating manner, which are arranged as multi-track and perpendicular to the transport direction adjacent to one another to form a common transport surface, on which the containers stand upright with their container bases, wherein each transport element comprises a dedicated electric drive motor, wherein the drive motors are external-rotor motors with an internal stator connected in a torsion-resistant manner to the machine frame and with an external rotor, which forms an offset drive driving the respective transport element, that the drive motors of at least two transport elements are arranged coaxially with their drive or motor axles oriented perpendicular to the transport direction, and the stators of which are connected via a common support in a rotation-resistant manner to the machine frame.

2. The apparatus of claim 1, wherein for a plurality of drive motors allocated in each case to one transport element a common support in the form of a support axle is provided, which engages through openings or passage apertures in the stators of the drive motors and on which these stators are held in a torsion-resistant manner by non-positive or positive fit connection.

3. The apparatus of claim 2, wherein the support axle presents, at least at a part length engaging through the respective passage aperture, a cross-section deviating from circular, to which the cross-section of the respective passage aperture is matched.

4. An apparatus on which containers stand on their respective bases while being conveyed along a transport direction, said apparatus comprising a multi-track conveyor comprising a machine frame, a common support, transport elements, drive units, drive motors, internal stators, and external rotors, said transport elements, drive units, drive motors, internal stators, and external rotors comprising a first transport element, a second transport element, a first drive unit, a second drive unit, a first drive motor, a second drive motor, a first internal stator, a second internal stator, a first external rotor, and a second external rotor, wherein each of said first and second transport elements defines a track of said conveyor, wherein each of said first and second transport elements forms a closed loop, wherein each of said first and second transport elements is capable of being driven in an endlessly circulating manner, wherein each of said first and second transport elements extends in a transport direction, wherein said first and second transport elements are arranged adjacent to each other along a direction perpendicular to said transport direction, wherein said first and second transport elements collectively define a common transport surface on which said containers stand upright on their container bases while being conveyed along said transport direction, wherein said first transport element comprises said first drive unit, wherein said first drive unit comprises said first drive motor, said first drive motor being a dedicated electric drive motor, wherein said first drive motor comprises said first internal stator and said first external rotor, wherein said first internal stator is connected in a torsion-resistant manner to said machine frame, wherein said first external rotor forms an offset drive for driving said first transport element, wherein said second transport element comprises said second drive unit, wherein said second drive unit comprises said second drive motor, said second drive motor being a dedicated electric drive motor, wherein said second drive motor comprises said second internal stator and said second external rotor, wherein said second internal stator is connected in a torsion-resistant manner to said machine frame, wherein said second external rotor forms an offset drive for driving said second transport element, wherein said first and second drive motors are arranged coaxially with motor axles thereof oriented along a direction that is perpendicular to said transport direction, wherein said first and second stators are connected in a rotation-resistant manner to said machine frame, and wherein said first and second stators connect to said machine frame via said common support.

5. The apparatus of claim 4, wherein said drive motors comprise torque motors.

6. The apparatus of claim 4, further comprising motor housings, each of which comprises one of said external rotors.

7. The apparatus of claim 4, wherein said motor axles of said first and second drive motors are offset from each other along said transport direction.

8. The apparatus of claim 4, wherein said common support comprises a support axle, wherein said first and second stators comprise passage apertures through which said support axle extends, wherein, as a result of engagement between said stators and said support axle, said stators are held in a torsion-resistant manner.

9. The apparatus of claim 8, wherein said stators are held by a positive fit connection.

10. The apparatus of claim 8, wherein said stators are held by a non-positive fit connection.

11. The apparatus of claim 8, wherein said support axle has a non-circular cross section, and wherein said passage aperture matches said non-circular cross section.

12. The apparatus of any one of claim 8, wherein said drive motors comprise first and second groups, wherein said first group comprises said first and second motors, wherein said first and second motors are arranged on said common support, and wherein motors of said first and second groups are offset from each other.

13. The apparatus of claim 4, wherein each of said drive units comprises a control device, wherein each control device is dedicated to controlling one drive motor.

14. The apparatus of claim 4, wherein said drive units comprise a control device for controlling said first and second drives.

15. The apparatus of claim 4, wherein said drive units comprise control devices, each of said control devices being dedicated to controlling a subset of two or more of said drive motors.

16. The apparatus of claim 4, wherein said drive motors are arranged beneath said transport common transport surface.

17. The apparatus of claim 4, wherein said transport elements comprise transport bands.

18. The apparatus of claim 4, wherein said transport elements comprise transport chains.

19. The apparatus of claim 4, wherein said transport elements comprise transport belts.

20. The apparatus of claim 4, wherein said transport elements comprise hinge band chains.

* * * * *